United States Patent
Liu et al.

(10) Patent No.: US 8,209,532 B2
(45) Date of Patent: Jun. 26, 2012

(54) SYSTEM AND METHOD FOR IMPLEMENTING SECURITY OF MULTI-PARTY-COMMUNICATION

(75) Inventors: Ya Liu, Shenzhen (CN); Fuyou Miao, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 787 days.

(21) Appl. No.: 12/351,548

(22) Filed: Jan. 9, 2009

(65) Prior Publication Data

US 2009/0150668 A1    Jun. 11, 2009

Related U.S. Application Data

(63) Continuation of application No. PCT/CN2007/070285, filed on Jul. 12, 2007.

(30) Foreign Application Priority Data

Jul. 13, 2006    (CN) .......................... 2006 1 0099311

(51) Int. Cl.
*H04L 29/06* (2006.01)
(52) U.S. Cl. .......................... 713/163; 713/152; 380/277
(58) Field of Classification Search .................... 713/163
See application file for complete search history.

(56) References Cited

U.S. PATENT DOCUMENTS

| | | | |
|---|---|---|---|
| 6,785,809 B1 * | 8/2004 | Hardjono ....................... | 713/163 |
| 7,395,423 B1 * | 7/2008 | Dondeti et al. ................ | 713/151 |
| 7,509,491 B1 * | 3/2009 | Wainner et al. ............... | 713/163 |
| 7,558,877 B1 * | 7/2009 | Fedyk et al. .................. | 709/242 |
| 7,724,732 B2 * | 5/2010 | Guichard et al. ............. | 370/389 |
| 2005/0141706 A1 | 6/2005 | Regli | |
| 2006/0062384 A1 | 3/2006 | Dondeti | |

FOREIGN PATENT DOCUMENTS

CN    1791098 A    6/2006
(Continued)

OTHER PUBLICATIONS

Nishi et al., "Group key distribution scheme for reducing required rekey message size", 2005, Proceedings of the 2005 11th International Conference on Parallel and Distributed Systems (ICPADS'05), pp. 1-5.*

(Continued)

*Primary Examiner* — Matthew Smithers
(74) *Attorney, Agent, or Firm* — Brinks Hofer Gilson & Lione

(57) ABSTRACT

A system and method for implementing security of multi-party communication is disclosed in the disclosure. The system mainly includes a group key management unit and a record protocol unit. The method mainly includes when the system runs in the centralized group key management mode, the Group Controller and Key Server (GCKS) establishes and stores a Group Security Association, the GCKS negotiates with the group members to establish an Initiation Security Association, under the protection of the Initiation Security Association, the group members obtain the Group Security Association from GCKS. When the system runs in the distributed group key management mode, a Group Security Association is established by all the group members together at the beginning of the group communication. The system runs in the application process space and can provide an application program (or application protocol) with the function of the group key management and data security of the multi-party communication in the form of the standard Application Programming Interface (API).

14 Claims, 3 Drawing Sheets

FOREIGN PATENT DOCUMENTS

| CN | 1801696 A | 7/2006 |
|---|---|---|
| CN | 101106449 B | 5/2010 |

OTHER PUBLICATIONS

Office Action issued in corresponding Chinese Patent Application No. 2006100993113; issued May 27, 2009.

International Search Report issued in corresponding PCT Application No. PCT/CN2007/070285; mailed Oct. 25, 2007.

Office Action issued in corresponding Chinese Patent Application No. 200610099311.3, mailed Jun. 26, 2009.

International Preliminary Report on Patentability issued in corresponding PCT Patent Application No. PCT/CN2007/070285, mailed Jan. 13, 2009.

Arkko et al., "MIKEY: Multimedia Internet KEYing" Network Working Group, Aug. 2004.

Baugher et al., "The Group Domain of Interpretation" Network Working Group, Jul. 2003.

Dierks et al., "The Transport Layer Security (TLS) Protocol" Version 1.1, Apr. 2006.

Harney et al., "GSAKMP: Group Secure Association Key Management Protocol" Network Working Group, Jun. 2006.

Rescorla et al., "Datagram Transport Layer Security" Network Working Group, Apr. 2006.

* cited by examiner

SYSTEM AND METHOD FOR IMPLEMENTING SECURITY OF MULTI-PARTY-COMMUNICATION

CROSS REFERENCES TO RELATED APPLICATIONS

The present application is a continuation application of PCT/CN2007/070285, filed Jul. 12, 2007, which claims the benefit of Chinese Patent Application No. 200610099311.3, filed Jul. 13, 2006, both of which are hereby incorporated by reference in their entirety.

FIELD OF THE DISCLOSURE

The present disclosure relates to the field of network communication, and particularly to a system and method for implementing the security of multi-party communication.

BACKGROUND OF THE DISCLOSURE

A multi-party communication is a communication scenario in which two or more members participate. A communication scenario in which only two members participate is a special case of the multi-party communication. The multi-party communication scenario generally includes a plurality of data receivers and one or more data senders. In the multi-party communication, a message may be sent using unicast technology or multicast technology and it is easier to implement the multi-party communication using the multicast technology than the unicast technology.

Typical multi-party communication scenarios include a remote multi-party conference, an IP telephony, an IPTV, a network on-line gaming, a grid computing, etc. The security of multi-party communication includes access control (authorization and authentication) of multi-party communication participators and security services such as encryption, integrity protection, replay protection, source authentication, and group authentication of communication contents that are used to prevent one other than a group member of the multi-party communication from intercepting and tampering with the communication contents or interfering with the normal communication and which further eliminate a threat to security caused by an internal group member of the multi-party communication.

Requirements on the security of multi-party communication primarily may include:

1. Authorization and authentication. A user may participate in a multi-party communication group and may receive/send data only if the user is authorized and authenticated so that the multi-party communication group is controllable.

2. Secrecy. A node may decrypt the contents of a group communication message only if the node has the decryption key.

3. Authentication of group member. A non-group member cannot generate valid authentication information, and therefore cannot impersonate a group member to send a multicast message.

4. Source authentication (anti-denial). A group member cannot generate the authentication information of another group member, and therefore cannot impersonate another group member to send a multicast message. On the other hand, the group member cannot deny the information sent by the group member.

5. Anonymity. A group member is provided with a mechanism of speaking anonymously. In other words, a receiving party cannot determine the identity of the sending party from the received multicast message.

6. Integrity. A means for verifying whether a received multicast message is tampered.

7. Anti-replay. A replay detecting mechanism is provided to implement the anti-replay attack.

Generally, in order to ensure the security of multi-party communication, a multi-party communication message is transmitted in an encrypted form. A multi-party shared key for encryption and decryption is known to group members only, thus ensuring that only the group members may decrypt the encrypted message. The multi-party shared key can also be used to implement the authentication of group member because only the group member having the multi-party shared key can generate the encrypted multicast message correctly.

The implementation of the security of multi-party communication using the above-mentioned multi-party shared key depends on the generating and distributing of the key. The generation and distribution of the key must be exclusive. In other words, a non-group m ember cannot get the generated and distributed key. Generally, the source authentication, the integrity, and the anonymity also need the exclusive sharing of secret information among two or more parties. In the multi-party communication, how to achieve the exclusive sharing of key is a group key management research topic where the group key is a secret shared by all the group members and is used for security operations such as encryption and decryption on a multicast message. The research on group key management focuses on how to generate, distribute, and update a group key for group members and further how to address the problems of scalability, robustness, and reliability.

In the prior art, a solution for implementing the security of multi-party communication includes a management solution using the Multicast Security (MSEC) protocol suite designed by the MSEC working group. As a working group under the Internet Engineering Task Force (IETF) security area, the MSEC is dedicated to the IP multicast security and has established several security protocols. The schematic diagram of the operation of the MSEC protocol suite is shown in FIG. 1.

The design concept of the protocols by the MSEC working group is to separate the group key management from the data security and focus on the group key management. The MSEC working group has already standardized a plurality of group key management protocols including the Group Secure Association Key Management Protocol (GSAKMP), the Group Domain of Interpretation (GDOI), the Multimedia Internet Key management (MIKEY), and the like. All of these protocols tend to provide a standard group key management solution for a data security protocol based on multicast.

In terms of operation mode, the MSEC protocol suite is relatively suitable for operating in a n environment supporting IP-layer multicast. F or example, the GSAKMP protocol and the GDOI protocol simply utilize the group key management algorithm requiring a multicast service. Although such a group key management algorithm may operate based on unicast, the operating efficiency is severely affected. However, no optimized measure is specified for substituting the multicast mode with the unicast mode in the above two protocols. In addition, the MIKEY protocol also needs to utilize the multicast operation mode when operating in the multi-party communication mode.

In terms of the supported data security protocols, the MSEC protocol suite is scalable whereas the MSEC protocol suite mainly supports the Encapsulating Security Payload (ESP) protocol and the Authentication Header (AH) protocol which operate at the IP layer, and the data security service of multi-party communication is provided in the multicast mode only.

Examples of the ways in which the above management solution of the MSEC protocol suite designed by the SEC working group is disadvantageous are described below.

1. It is difficult to provide a standard Application Program Interface (API) to an application program and an application protocol.

A group key management protocol and a data security protocol are designed to be separate from each other in the MSEC protocol suite. Each group key management protocol, such as the GDOI protocol and the GSAKMP protocol, may only operate individually as a daemon or an application program and cannot provide the application program with a set of standard APIs to control the group key management. Therefore, in this solution, the application program developed based on the group key management protocol has poor portability.

Further, the operation of the MIKEY protocol requires the MIKEY protocol to be embedded into an application program employing the service of the MIKEY protocol. In other words, the application program may employ the function of the MKEY protocol only if the application program implements by itself the interaction process of the MIKEY protocol which increases the coupling degree between the MIKEY protocol and the application program so that each programmer has to possess acknowledge of the internal implementation of the MIKEY protocol to use the functions of the MIKEY protocol, resulting in more difficulties in implementing the application program.

In terms of the data security, the MSEC protocol suite mainly supports the ESP protocol and the AH protocol at present, both of which are implemented at the IP layer and need to operate within the core of an operating system. Accordingly, such a way of implementation results in not only poor program portability because no standard API for data security can be provided, but also the impact on the deployment of an application program because various operating systems have different supportabilities of the ESP protocol and the AH protocol and even some of the operation systems cannot support the ESP protocol and the AH protocol. In practice, only systems of Windows, Linux, Unix, and some special-purpose network devices such as a firewall support the IPsec. Other systems such as mobile phones and small scale routers rarely support the IPsec.

Furthermore, even though the MSEC protocol suite may support a new data security protocol after extension, the service provided by the MSEC protocol suite cannot be utilized by an application program due to lack of a general data security protocol which may be invoked directly by the application program and support the multi-party communication.

2. The implementation is based on a centralized management mode and does not support the distributed key negotiation.

The MSEC protocol suite is dependant upon a key server to implement the security of multi-party communication with more than two parties and therefore does not support the purely distributed multi-party communication scenario in a peer-to-peer (P2P) network and the like.

3. The system is very complicated and is very difficult to be implemented.

The MSEC is derived from the IPsec which is a system for providing a data security service at the IP layer. This data security service is end-to-end other than process-to-process. The IPsec may provide the end-to-end data security service in various modes su ch as host-to-host, host-to-gateway, and gateway-to-gateway. In addition, in order to support a VPN function, the data security is implemented in two separated modes in the IPsec, i.e., a tunnel mode and a transport mode, and the tunnel mode is used for implementing an IPsec tunnel.

Accordingly, an IPsec system is very large and complicated as a result of the above implementation mode and requirements. There are more than ten RFCs on the IPsec only, covering the aspects of system architecture, key management, data security, algorithm description, and the like. Because of the complexity, there are few implementations of the entire IPsec in practice. Currently, the IPsec is supported primarily in some popular operating systems (such as Windows, Linux, and Unix), and special-purpose network devices such as a firewall and some high-end routers. In addition, the IPsec tends to be used for the IPsec VPN in the industry at present.

Similarly, the MSEC is not suitable for implementing the process-to-process data security service due to inheriting the above characteristics (or disadvantages).

4. The data security service is implemented at the IP layer, and no data protection function with a granularity finer than quintuple can be provided.

The IPsec filters messages using the quintuple to select a message needing to be protected and performs the encryption and integrity protection on the selected message. However, the granularity of quintuple of the IPsec is not fine enough to identify precisely the particular session of an application. For those P2P Overlay platforms re-constituting their own protocol stacks over the TCP/IP protocol stack, the mechanism of quintuple of the IPsec cannot even identify an application on these platforms and therefore cannot provide the data security service at the application-to-application level for the P2P Overlay platforms. These disadvantages are inherited by the MSEC.

When operating in connection with a data security protocol of Secure Real-time Transport Protocol (SRTP), the MSEC may offer a data security service at the level as fine as an Real-time Transport Protocol (RTP) Session. However, the SRTP is constituted especially for the RTP and is not a general data security protocol.

In the prior art, another solution of implementing the security of multi-party communication is a solution of security of two-party communication based on the Transport Layer Security (TLS, a security protocol based on a reliable connection-oriented transmission) and the Wireless Transport Layer Security (DTLS, a security protocol based on an unreliable connectionless transmission) technologies.

The TLS and the DTLS operate between an application layer and a transport layer, enabling to provide a standard API for an application program so that the application program may invoke the standard API and control the function of the TLS and the DTLS. Further, the TLS and the DTLS operate in the application program process space, allowing easy interaction with the application program. The TLS and DTLS operate in a Client/Server mode and may provide security functions such as authentication, key negotiation, key update, encryption, integrity protection, and anti-replay.

The above solution of security of two-party communication based upon the TLS and DTLS has at least the following disadvantages described herein. To be specific, this solution may provide a security service for a communication with only two parties. For a communication scenario with three or more parties, the security service may be provided only through an approach of establishing multiple sessions which has a very low feasibility due to its complexity and low efficiency.

SUMMARY OF THE DISCLOSURE

A system and a method for implementing the security of multi-party communication is provided in embodiments of the present disclosure so as to provide, in a standard API form, the functions of group key management and data security of multi-party communication for an application program (or application protocol).

The embodiments are implemented through the following technical solutions.

A system for implementing the security of multi-party communication includes a group key management unit adapted to provide a group key management service to an application program or an application protocol, a record protocol unit adapted to provide a multi-party communication data security service to the application program, or the application protocol, and the group key management unit wherein the system runs in the application program process space.

A method for implementing the security of multi-party communication when a multi-party communication system runs in a centralized group key management mode includes creating and storing, by Group Controller and Key management Server (GCKS), a Group Security Association, creating an Initiation Security Association, by the GCKS and a group member, through the negotiation between the GCKS and the group member, and obtaining, by the group member, the Group Security Association from the GCKS under the protection provided by the Initiation Security Association through an application program corresponding to the group member running the Handshake protocol using an Application Program Interface (API).

A method for implementing the security of multi-party communication when a multi-party communication system runs in a distributed group key management mode includes creating jointly, by all the group members, a Group Security Association at the beginning of a group communication through an application program corresponding to each group member running the Handshake protocol using an Application Program Interface.

As can be seen from the above technical solutions provided in the embodiments, through designing the group key management and the data security protocol in an integrated mode in the embodiments, the functions of group key management and data security of multi-party communication may be provided respectively to an application program. Further, not only a centralized group key management but also a distributed group key management may be supported in the embodiments.

DETAILED DESCRIPTION OF THE DISCLOSURE

A system and method for implementing the security of multi-party communication are provided in embodiments of the present disclosure. In the embodiments, the group key management and data security protocol are designed in an integrated mode, and the group key management and the data security service are provided in the form of an Application Program Interface (API) to an application program.

Figure 1:
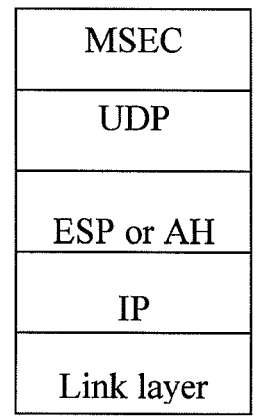
FIG. 1 is a schematic diagram illustrating the operation mode of the MSEC protocol suite.
Figure 2:
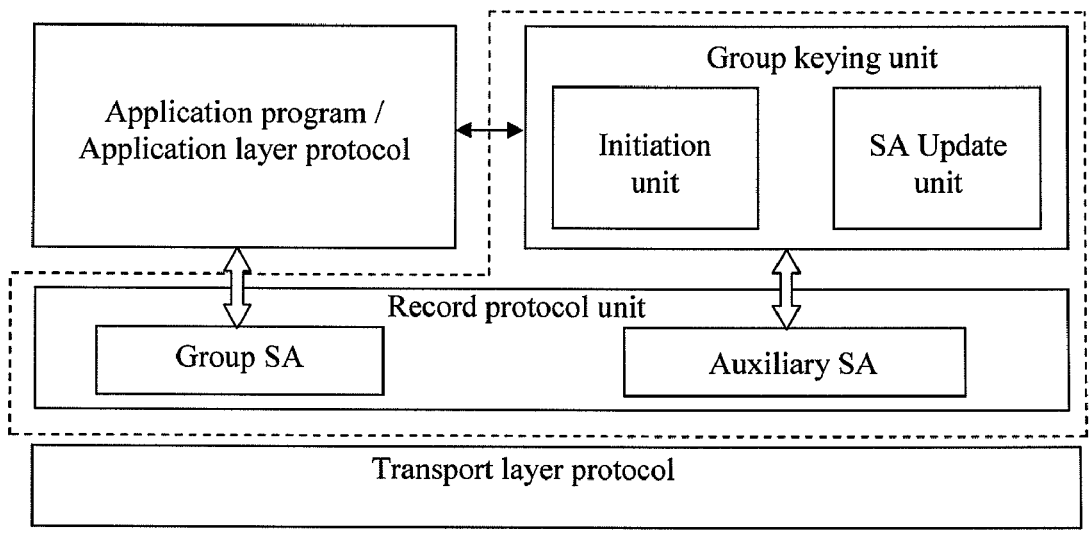
FIG. 2 is a schematic diagram illustrating the internal structure of a system according to an embodiment of the present disclosure.

Hereinafter, the system according to an embodiment of the present disclosure will be described in detail with reference to drawings. The structural diagram of an example of a system for implementing the security of multi-party communication according to the present disclosure is shown in FIG. 2. The system includes a group key management unit and a record protocol unit.

The system for implementing the security of multi-party communication according to one embodiment requires the underlying transport protocol to have a function of multiplexing/de-multiplexing, thereby performing the network communication at the level of application program. The data receiving/sending service provided by the transport protocol may be reliable or unreliable. For example, the User Datagram Protocol (UDP), the Data Communication Control Protocol (DCCP), or the Transmission Control Protocol (TCP) may be used as the transmission protocol. The underlying transport protocol of the system according to the embodiment may be a protocol at the transport layer of the TCP/IP, or the underlying transport protocol may be at a transport layer over the application layer, for example the transport layer at the P2P overlay network platform. Such transport layer is characterized by being constructed over the application layer of the TCP/IP protocol stack. One example of such underlying transport protocol is the pipe service at the P2P platform of the open source project JXTA.

The system for implementing the security of multi-party communication in the embodiment runs in the application program process space and provides the application program or application protocol with a set of standard API function invoking interfaces, the group key management, and data security service.

A data sending mode of unicast, multicast, or a mix of the unicast and multicast may be used in the system for implementing the security of multi-party communication according to the embodiment.

In the system for implementing the security of multi-party communication according to the embodiment, the group key management unit is used for providing an function of access control (authorization/authentication) of a user, providing the group key management service to the application program or the application protocol, offering services such as the creation, update, and distribution of a Group Security Association (Group SA), and delivering the Group SA information to a record protocol unit. The group key management unit includes an initiation unit and an SA update unit and may be implemented through the Handshake (i.e., the Handshake Protocol) which is also referred to as group key management protocol.

The initiation unit is adapted to provide the function of access control of a user and to create and distribute a Group SA. Alternatively, in the embodiment of the present disclosure, the function of access control of the user and the function of creating and distributing the Group SA provided by the initiation unit may also be implemented by two separate function modules, respectively.

The SA update unit is adapted to update the Group SA to perform the functions of forward/backward encrypting and anti-conspiracy decrypting.

Generally, the SA includes a key and several algorithms (such as an encrypting algorithm). Further, the SA may include some auxiliary information such as an ID. The update of the SA is to update an existing key. The group key management unit may also create some internal auxiliary SAs including an Initiation SA and a Re-key SA. Whether to create an internal auxiliary SA or not is dependent upon the group key management algorithm used in the system according to the embodiment. If the system according to the embodiment is in a solution of centralized group key management, the group key is created and updated by a key server. In this case, it is necessary to create an internal auxiliary SA to protect the distribution and update of the group key. If a solution of distributed group key management is used, the group key is negotiated by all the group members jointly, and it is not necessary to create the auxiliary SA because the negotiation algorithm per se can ensure the security in negotiating.

In the system for implementing the security of multi-party communication in the embodiment, the record protocol unit is adapted to provide the data security service of multi-party communication to the application program (or application protocol) and the group key management unit where the data security service includes the encryption, integrity protection, anti-replay, source authentication, anti-disavow, group authentication and the like. Further, the record protocol unit may provide a function of data compression for saving the network bandwidth.

Both the centralized group key management mode and the distributed group key management mode are supported in the system according to the embodiment. Hereinafter, the particular processes of the centralized group key management mode and the distributed group key management mode of the system in the present embodiment will be described, respectively.

1. The particular process of the centralized group key management mode.

Figure 3:
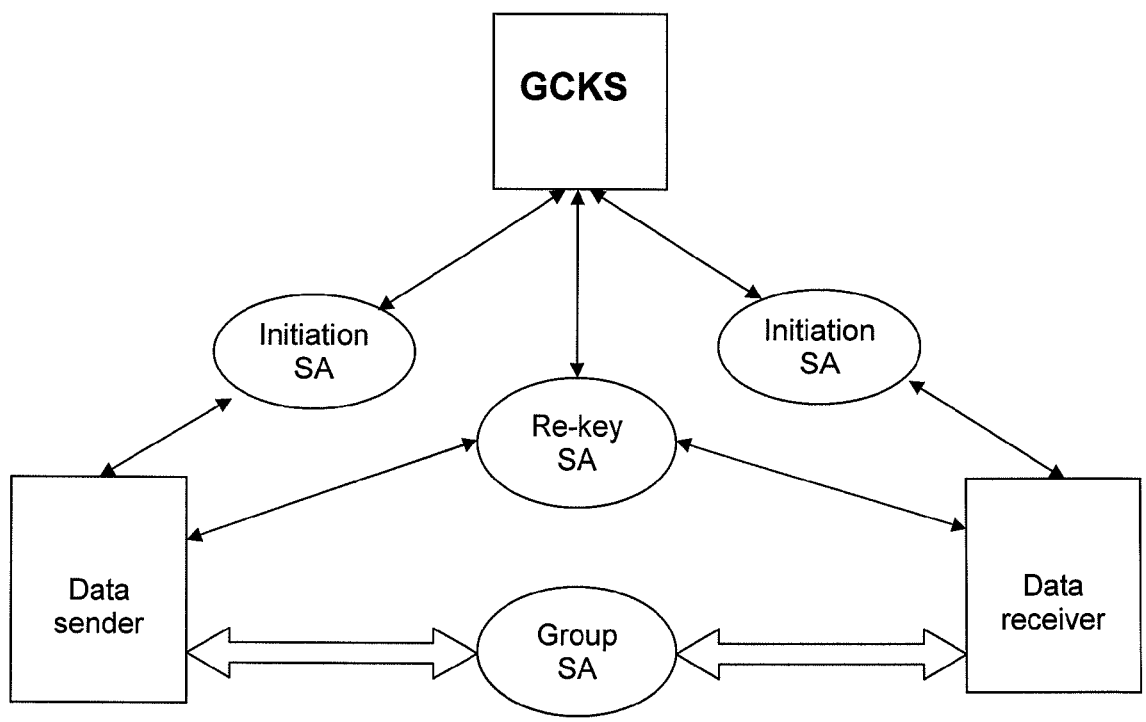
FIG. 3 is a schematic diagram illustrating the practical deployment of a system operating in a centralized group key management mode according to an embodiment of the present disclosure.

In FIG. 3, a schematic diagram illustrating the practical deployment of the system operating in the centralized group key management mode according to an embodiment of the present disclosure is shown. When operating in the centralized group key management mode, the system for implementing the security of multi-party communication in the embodiment is configured within it a Group Controller and Key Server (GCKS). The system is based on a Client/Server mode with the GCKS acting as the server of the Handshake, and a group member acting as the client of the Handshake. The entire system includes one GCKS and several group members.

The GCKS is used for the access control of a group member and for the group key management. A certain group member (such as a data sender) may also act as the GCKS. In the centralized group key management mode, in addition to a Group SA, an Initiation AS for protecting the initiation process is also included in the system. If a function of group Rekeying is desired, a further Re-key SA for protecting a Rekeying message is provided in the system. The Group SA and the Re-key SA is firstly created by the group key management unit of the GCKS and stored in the GCKS.

The position and the identifier of the GCKS are distributed to each group member through other technical means. The application program corresponding to each group member initiates the running of the Handshake protocol using the API provided in the system according to the embodiment. First, the Handshake protocol runs a sub-protocol Initiation (i.e. an initiation unit), the GCKS performs the identity authentication of group members, and the group members negotiate with the GCKS to create auxiliary Initiation SAs. Then, each group member downloads the Re-key SA (optional) and the Group SA from the GCKS through the sub-protocol Initiation under the protection provided by the auxiliary Initiation SAs.

After the initiation process of each group member, the sub-protocol Rekeying (Security Association update unit) of the Handshake protocol may be run as required to update the SA key of each group member. The particular process of the update includes: upon detecting key disclosure, key expiration, leaving of a group member, joining of a new group member or some other key update events, updating automatically, by the GCKS, the key for the Group SA and the Re-key SA and then distributing the updated Group SA and Re-key SA to all the group members through the sub-protocol Rekeying, receiving, by the group members, a Rekeying message through the sub-protocol Rekeying, and performing the update of the Re-key SA and the Group SA where the Rekeying message is under the protection provided by the Re-key SA.

The above process of the sub-protocol Rekeying may be performed either in a multicast mode or in a unicast mode. In the case of the unicast mode, some optimization measures may be taken by the sub-protocol Rekeying to mitigate the load of the GCKS in sending messages and improve the rate of sending the Rekeying messages successfully.

2. The particular process of the distributed group key management mode

Figure 4:
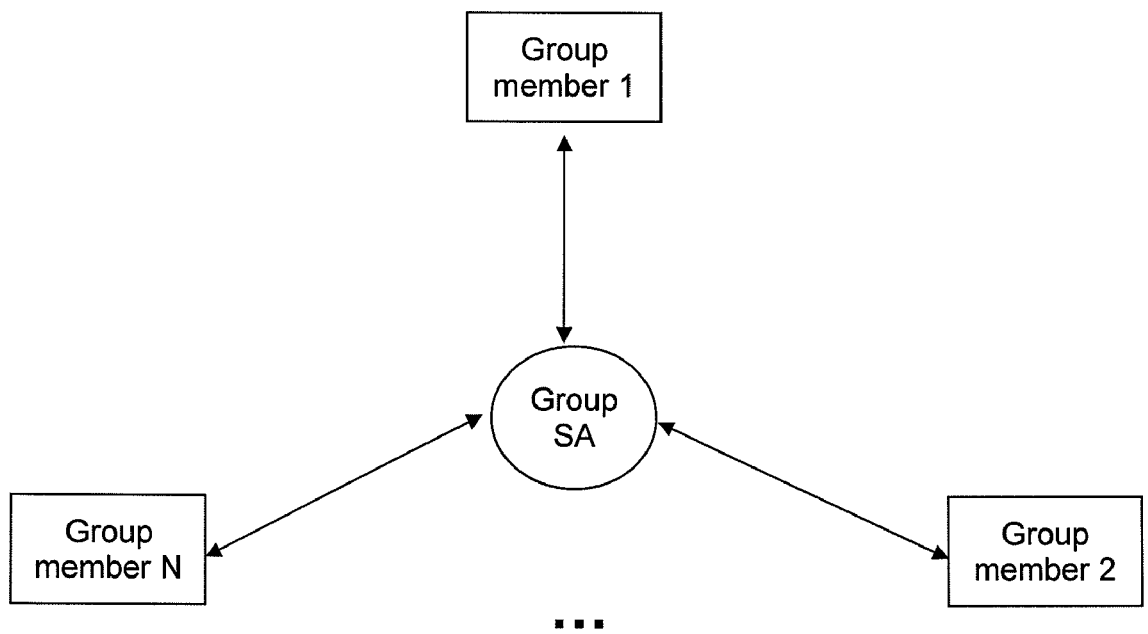
FIG. 4 is a schematic diagram illustrating the practical deployment of a system operating in a distributed group key management mode according to an embodiment of the present disclosure.

In FIG. 4, a schematic diagram illustrating the practical deployment of the system operating in the distributed group key management mode according to an embodiment of the present disclosure is shown. When the system for implementing the security of multi-party communication in the embodiment runs in the distributed group key management mode, all of the group members create and update the group key jointly. In this case, the group creator may act as a group controller to be responsible for the access control. All the members desiring to join in the group need to pass the authorization and the identity authentication of the group controller. Here, the group members perform the authentication through running the sub-protocol Initiation of the Handshake.

In the distributed group key management mode, the system includes only the Group SA which is initiated by the group creator and created by all the group members jointly at the beginning of the group communication. In the event of joining of a new group member, leaving of an existing group member, key disclosure, manual update by an administrator, key expiration, or some other key update events, the group key and the Group SA are updated jointly by all the group members through the sub-protocol Rekey management. Here, the update process may be initiated by the group creator or by other group members.

In the embodiments of the disclosure, through designing the group key management and the data security protocol in the integrated mode, the functions of group key management and data security of multi-party communication may be provided to the application program (or application protocol) in the form of a standard API, and all the functions are implemented in the user process space, thus obtaining high portability and deployability.

In the embodiments of the disclosure, not only the centralized group key management but also the distributed group key management may be supported through the replacement mechanism of the group key management algorithm.

In the embodiments of the present disclosure, the multicast service offered by the underlying layer may be utilized without multicast dependency, and the multi-party communication scenario with two or more parties may be supported.

The present disclosure has been illustrated and described with reference to the exemplary embodiments. However, the protection scope is not limited to these embodiments. It will be appreciated that various variations and modifications that are readily occurred to those ordinary skilled in the art can be made without departing from the spirit of the present disclosure. All these variations and modifications are intended to be within the scope of the disclosure defined by the following claims.

What is claimed is:

1. A system for implementing application-to-application level security of multi-party communication, comprising:
a group key management unit configured to provide a group key management service to an application program or an application protocol, create a Group Security Association (Group SA), and deliver the Group SA to a record protocol unit; and
the record protocol unit configured to provide a multi-party communication data security service to the application program or the application protocol, and the group Key management unit;
wherein the system runs in an application program process space, and provides a standard Application Programming Interface (API) function invoking interface to the application program or the application protocol.

2. The system according to claim 1, wherein the group key management unit comprises: an initiation unit configured to provide an access control service for users and to create and distribute the Group Security Association.

3. The system according to claim 2, wherein the group key management unit further comprises: a Security Association update unit configured to update the Group Security Association.

4. The system according to claim 1, wherein the data security service comprises at least one of an encrypting service, an integrity protection service, an anti-replay service, a source authentication service, an anti-disavow service, and a group authentication service.

5. The system according to claim 4, wherein the record protocol unit is further configured to provide a data compression service.

6. The system according to claims 1, wherein the system supports a centralized group key management mode or a distributed group key management mode.

7. The system according to claim 6, wherein when the system is in a centralized group key management mode an internal auxiliary Security Association is created by the group key management unit to protect the distribution of the Group Security Association, wherein the auxiliary Security Association includes an Initiation Security Association.

8. The system according to claim 7, wherein an internal auxiliary Security Association is created by the group key management unit to protect the update of the Group Security Association, wherein the auxiliary Security Alliance includes a Re-key Security Association.

9. The system according to claim 1, wherein a data sending mode of unicast, multicast mode, or a mix of the unicast and multicast is employed in the system.

10. A method for implementing application-to-application level security of multi-party communication, wherein when a multi-party communication system runs in a centralized group key management mode, the method comprises:
creating and storing, by Group Controller and Key Server (GCKS) a Group Security Association;
creating an Initiation Security Association, by the GCKS and a group member, through negotiation between the GCKS and the group member; and
obtaining, by the group member, the Group Security Association from the GCKS under the protection provided by the Initiation Security Association through an application program corresponding to the group member running the Handshake protocol using an Application Program Interface(API);
wherein the system runs in an application program process space, and provides a standard API function invoking interface to the application program or the application protocol.

11. The method according to claim 10, further comprising: creating and storing, by the GCKS, a Re-key Security Association.

12. The method according to claim 11, further comprising:
performing identity authentication between the GCKS and the group member; and
obtaining, by the group member, the Re-key Security Association from the GCKS under the protection provided by the Initiation Security Association, through an application program corresponding to the group member running the Handshake protocol using an Application Program Interface (API).

13. The method according to claim 12, further comprising:
updating, by the GCKS upon detecting a key update event, the Group Security Association and the Re-key Security Association, wherein the update is under the protection provided by the current Re-key Security Association;
sending, by the GCKS, the updated group Security Association and Re-key Security Association to all the group members via an update message; and
receiving, by the group members, the update message, verifying the update message, and decrypting the update message after the verification is passed to obtain information of the Group Security Association and the Re-key Security Association carried by the update message so as to update the Group Security Association and the Re-key Security Association.

14. The method according to claim 13, wherein the key update event comprises at least one of key disclosure, key expiration, manual update by an administrator, leaving of a group member, and joining of a new group member.

* * * * *